Figure 1:
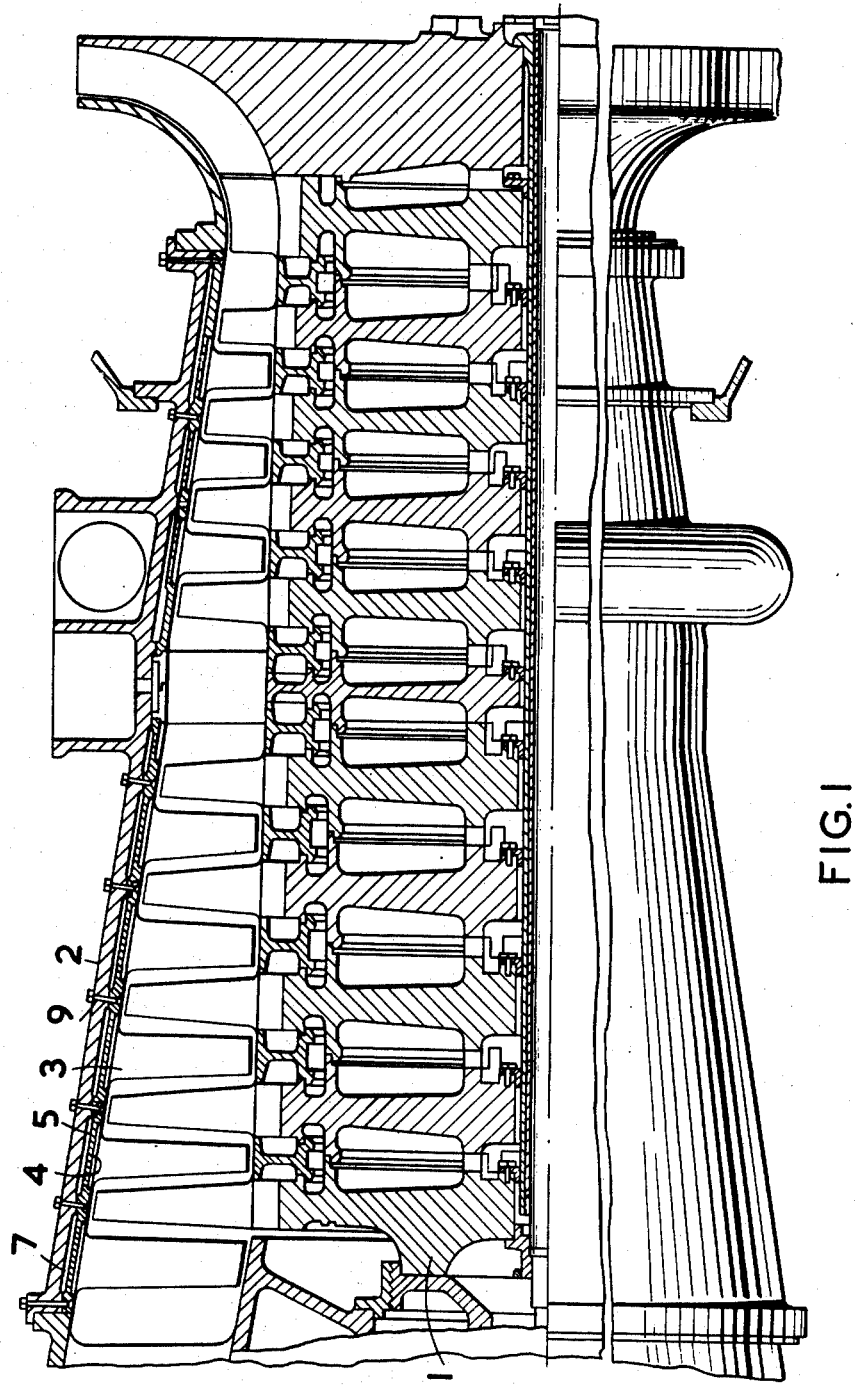

Dec. 30, 1952    G. B. R. FEILDEN ET AL    2,623,728
MOUNTING OF BLADES IN COMPRESSORS, TURBINES, AND THE LIKE
Filed Jan. 15, 1946    2 SHEETS—SHEET 2

Inventor
GEOFFREY BERTRAM ROBERT FIELDEN,
By
Robert B. Larson
Attorney

Patented Dec. 30, 1952

2,623,728

UNITED STATES PATENT OFFICE 2,623,728

MOUNTING OF BLADES IN COMPRESSORS, TURBINES, AND THE LIKE

Geoffrey Bertram Robert Feilden, Lutterworth, England, assignor to Power Jets (Research & Development) Limited, London, England Application January 15, 1946, Serial No. 641,316
In Great Britain January 16, 1945

5 Claims. (Cl. 253—78)

This invention relates to the mounting of the outer set of blades in axial flow compressors, turbines and the like and whilst its application is not necessarily limited thereto can be regarded as being concerned primarily with the mounting of fixed stator blading in axial flow multi-stage compressors, turbines, and ducted fans. Where such compressors or like machines are required for high performance purposes in aircraft or in similar circumstances, lightness is a desirable feature and it is of course also desirable that the blades should be mounted in a mechanically effective manner whilst being if possible individually removable. It is also desirable that they should be mounted in such a way that constructional considerations in relation to the machine as a whole are conveniently dealt with, notably the insertion and supporting of the blade in a casing.

Further the blade mounting should preferably be such as to leave or provide as smooth and uninterrupted a surface as possible exposed to the fluid flow in the blade passages. In multistage machines the exposed surface between one row of blading and the next which in effect forms the stationary shrouding of the inner set of (usually) rotating blading, should be capable of precision manufacture and should be such as to avert undue distortion or dimensional change so that tip clearance is well defined. To this end and especially in lightly built machinery it may be found expedient to provide for a circulation of air in the structure so as to tend to make uniform, the temperature distribution in the structure. The present invention, in its different aspects, seeks to provide for these various requirements and is intended to have immediate application to a multistage axial flow compressor to form part of a gas turbine power plant for aircraft propulsion, although the invention is of course not limited to such application.

According to this invention an outer bladed structure of a compressor, turbine, or the like, comprises individual blades or individual pluralities of blades each having a root platform secured in a shallow groove formed in the face of a blade supporting ring (which may be either of unitary or segmental construction) separate from and attached to an enclosing outer casing, the said ring being recessed on its face adjacent to the said casing to form a cavity suitable for the accommodation of blade securing rivet heads or the like, or to provide for fluid circulation, by being formed with axially spaced peripheral ribs on its face adjacent to the casing, which ribs fit corresponding seating surfaces on said casing. Preferably the ungrooved part of the inner surface of the blade supporting ring is arranged to be in axial register with the exposed faces of the root platforms in the grooves so that the general profile of the fluid passage between the blades has a smooth continuous contour. The blades may be secured in the groove or ring by bolts, rivets or similar means.

The use of a blade supporting ring separate from and attached to the main structure of the bladed body has the advantage of simplifying the operation of machining the blade seating grooves, which is more easily effected in separate rings than, for instance, in the internal face of a long stator casing. Internal machining of the casing can be limited to the seatings of the rings therein.

Figure 2:
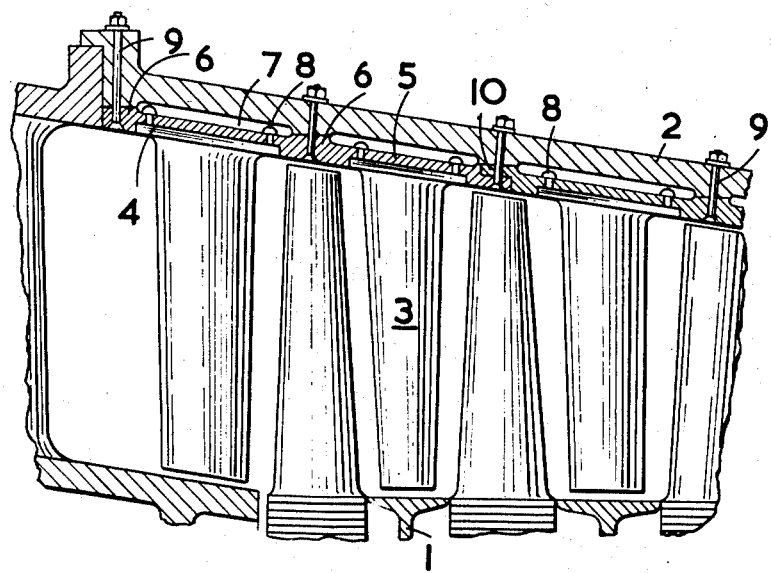
Figure 3:
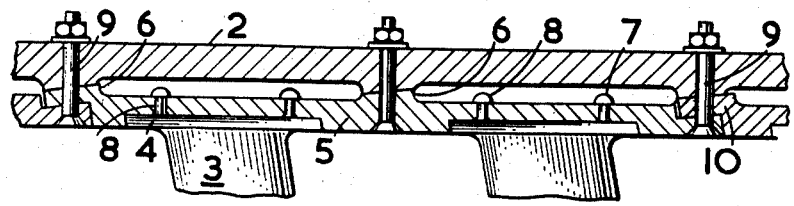

Further and more detailed features of the invention will appear from the following description with reference to the examples of construction illustrated in the accompanying drawings, in which:

Figure 1 is a part longitudinal section of a complete axial flow compressor having a stator construction in accordance with one form of the invention; and Figures 2 and 3 are enlarged details of the blade mounting illustrated in Figure 1.

In the construction illustrated in Figures 1 and 2, the compressor comprises a multistage bladed rotor 1 operating in an outer casing 2 constituting the main supporting structure of stator blades 3. The latter, whether they are made individually or in individual units each comprising a group of blades, are provided with integral shallow root platforms 4 suitably curved in the peripheral sense to suit the diameter at which they are placed, these platforms being seated in shallow grooves formed in the inner faces of rings 5 which have, externally, peripheral ribs 6 which co-operate with raised seating surfaces on the inside of the casing 2 and thus define between the rings 5 and casing 2, cavities at 7, which may be continuous or discontinuous peripherally, as desired. The blades 3 are rigidly secured in their grooves, in this instance by rivets 8 whose shanks are formed integrally with the blade platforms, the cavities 7 serving to accommodate the rivet heads.

The rings 5, which may alternatively be made each with only one groove, each have two blade supporting grooves seating a corresponding number of rings of blades and are secured to the outer casing 2 by bolts 9. The number of bolts is reduced by arranging for adjacent rings to have interengaging stepped flanges overlapping as at 10 so as to be securable by the same set of bolts. If necessary or desirable for greater convenience of assembly the rings 5 may be made in two or more peripheral segments.

It will be noted that the blade platforms are made to correspond in depth with the shallow grooves so that the inner exposed surfaces of the platforms and the ungrooved surface portions of the rings are in axial alignment to afford a general profile for the fluid passages between the blades having a smooth continuous contour.

The cavities 7 behind the blade platforms, in addition to accommodating the rivet heads, offer the possibility of providing a forced or natural circulation of cooling fluid.

I claim:

1. In an axial flow device such as a compressor or turbine, an outer bladed structure comprising a hollow casing of circular section, a plurality of rows of radially inwardly extending blades and a plurality of blade supporting rings within said casing, said rings being arranged in axial succession and abutment along said casing to form therein a fluidtight inner shell with a continuous inner surface, each ring being thin in the sense that its maximum radial dimensions at any point is only a small fraction of the axial extent thereof, each said ring having on its radially inner surface an annularly directed groove affording a non-retentive blade seating and on its radially outer surface at least two annularly directed and radially presented seating surfaces, axially spaced seating surfaces in said casing radially abutting at least one of said seating surfaces on each ring while maintaining the intervening parts of said casing and rings in radially spaced relationship, root platforms at the radially outer ends of said blades seating in said grooves, said platforms being flush with the inner surface of said rings, and means securing said platforms in said grooves.

2. In an axial flow device such as a compressor or turbine, an outer bladed structure comprising a hollow casing of circular section, a plurality of rows of radially inwardly extending blades and a plurality of blade supporting rings within said casing, said rings being arranged in axial succession and abutment along said casing to form a fluidtight inner shell with a continuous inner surface, each ring being thin in the sense that its maximum radial dimension at any point is only a small fraction of the axial extent thereof, each said ring having on its radially inner surface a plurality of annularly directed grooves affording non-retentive blade seatings, and on its radially outer surface a plurality of annularly directed and radially presenting seating surfaces, said surfaces being one greater in number than said grooves on the inner surface and being axially disposed alternately therewith, annularly directed axially spaced seating surfaces in said casing, radially abutting with at least all but one of said seating surfaces on each ring while maintaining the intervening parts of said casing and rings in radially spaced relationship, root platforms at the radially outer ends of said blades seating in said grooves, said platforms being flush with the inner surface of said rings, and means securing said platforms in said grooves.

3. In an axial flow device such as turbine or compressor, an outer bladed structure comprising a circular section hollow casing, a plurality of rows of inwardly extending blades, and a plurality of blade supporting rings within said casing, said rings being arranged in axial succession and abutment along said casing to form therein a fluidtight inner shell with a continuous inner surface and having their adjacent edges engaging in overlapping relationship and being complementarily formed so that one is supported radially by the other, each ring being thin in the sense that its maximum radial dimension at any point is only a small fraction of the axial extent thereof, each said ring having on its radially inner surface an annularly directed groove, affording a non-retentive blade seating, and on its radially outer surface two annularly directed and radially presented seating surfaces axially spaced to be on either side of said blade seating, annularly directed axially spaced seating surfaces in said casing radially abutting with at least one of said seating surfaces on each ring while maintaining the intervening parts of said casing and rings in radially spaced relationship, root platforms at the radially outer ends of said blades seating in said grooves, said platforms being flush with the inner surface of said rings, and means securing said platforms in said grooves.

4. An outer bladed structure as claimed in claim 3 wherein each ring has on its radially inner surface immediately adjacent one of its ends an annularly directed and radially presented seating surface, and on its radially outer surface immediately adjacent its other end an annularly directed and radially presented seating surface, the inner seating surface of one ring engaging with the outer seating surface of the adjacent ring, whereby said overlapping arrangement is provided.

5. In an axial flow device such as a compressor or turbine, an outer bladed structure comprising a circular section hollow casing, a plurality of rows of inwardly extending blades and a plurality of blade supporting rings within said casing, said rings being arranged in axial succession and abutment along said casing to form therein a fluidtight inner shell with a continuous inner surface and having their adjacent edges engaging in overlapping relationship and being complementarily formed so that one is supported radially by the other, each ring being thin in the sense that its maximum radial dimension at any point is only a small fraction of the axial extent thereof, each said ring having on its radially inner surface a plurality of annularly directed grooves affording a non-retentive blade seating, and on its radially outer surface a plurality of annularly directed and radially presented seating surfaces, said surfaces being one greater in number than said grooves on the inner surface and being axially disposed alternately therewith, annularly directed axially spaced seating surfaces in said casing radially abutting with at least all but one of said seating surfaces on each ring while maintaining the intervening parts of said casing and rings in radially spaced relationship, root platforms at the radially outer ends of said blades seating in said grooves, said platforms being flush with the inner surface of said rings, and means securing said platforms in said grooves.

GEOFFREY BERTRAM ROBERT FEILDEN.

REFERENCES CITED

The following references are of record in the file of this patent:

UNITED STATES PATENTS

| Number | Name | Date |
|---|---|---|
| 735,054 | Bentley | Aug. 4, 1903 |
| 775,108 | Elliott | Nov. 15, 1904 |
| 779,910 | Curtis | Jan. 10, 1905 |
| 792,659 | Junggren | June 20, 1905 |
| 990,321 | Westinghouse | Apr. 25, 1911 |
| 1,468,555 | Bonom | Sept. 18, 1923 |
| 2,220,616 | Roder | Nov. 5, 1940 |
| 2,241,782 | Jendrassik | May 13, 1941 |
| 2,258,792 | New | Oct. 14, 1941 |
| 2,405,164 | Pavlecka | Aug. 6, 1946 |

FOREIGN PATENTS

| Number | Country | Date |
|---|---|---|
| 110,556 | Switzerland | 1925 |
| 336,739 | France | Jan. 26, 1904 |